United States Patent [19]
Waldrip

[11] 4,034,735
[45] July 12, 1977

[54] SOLAR ENERGY SYSTEM

[76] Inventor: Ralph L. Waldrip, 8005 Stillbrooke, Manassas, Va. 22110

[21] Appl. No.: 655,147

[22] Filed: Feb. 4, 1976

[51] Int. Cl.² .......................................... F24J 3/02
[52] U.S. Cl. ................................ 126/270; 60/641; 250/203 R; 126/271
[58] Field of Search ........... 126/270, 271; 237/1 A; 60/641; 250/203 R

[56] References Cited

U.S. PATENT DOCUMENTS

| | | | |
|---|---|---|---|
| 3,421,004 | 1/1969 | Cashion | 250/203 R |
| 3,440,426 | 4/1969 | Bush | 250/203 R |
| 3,548,211 | 12/1970 | Gardner | 250/203 R |
| 3,892,433 | 1/1975 | Blake | 126/270 |

Primary Examiner—Kenneth W. Sprague
Assistant Examiner—James C. Yeung
Attorney, Agent, or Firm—Frank P. Cyr

[57] ABSTRACT

A system for collecting solar energy consists of a target for absorbing solar radiation positioned above a plurality of independently positionable reflectors, each reflector including a base, a concave circular reflecting surface, and means responsive to incident solar radiation for positioning the reflector with respect to the target and the sun such that solar radiation incident upon the reflectors will be directed toward the target. The system can also include means for initiating the positioning of the reflectors only in response to the presence of the sun above a predetermined minimum angle with respect to the horizon.

16 Claims, 4 Drawing Figures

SOLAR ENERGY SYSTEM

BACKGROUND OF THE INVENTION

1. Field of the Invention

This invention pertains generally to systems for collecting solar energy for storage in the form of a heated fluid medium and particularly relates to solar energy systems having a plurality of reflecting surfaces for collecting and focusing solar radiation on a target.

2. Description of the Prior Art

It has been recognized by many that solar energy is a unique source of energy which for all practical purposes is constantly self-renewing, has no harmful side effects in its use, such as polution of the environment, etc. It is abundant in most of the inhabited portions of the world in sufficient amount to be utilized as an appropriate source of power during a major portion of the year. Many attempts have been made to exploit this "free" energy, particularly for use for home heating and other domestic hot water production. The many attempts have not met with outstanding success and all such systems generally rely on alternative sources of energy when sun light becomes unavailable due to weather condition or time of year. While such modern storage media as eutectic salts have been developed which show the capability of retaining heat concentrations of several hundred degrees for lengthy periods of time, the storage of enough heat energy at 150° to last the average home through a month long cold cloudy period would require the dedication of more space in the home than most home owners are willing to allocate. The development of modern insulating materials are now making it possible to contain heat concentrations at even higher temperatures than before. The innovation of new storage media and superior insulating materials can be combined to provide a concentrated source of heat at high temperature thus providing increased reliability of the system.

In order that this heat level be obtained, it is necessary that the solar energy be concentrated by the use of appropriate optical devices together with heat collecting and transferring targets for transferring the solar energy collected to the heat storage media. Prior solar energy collectors have included trough-shaped refractors focusing the incident solar energy on a tube carrying a fluid media positioned at the focal point of the trough shaped reflector. The exposure of the media carrying tube over the length of the trough has the disadvantage, however, of permitting readmission of a significant portion of the heat collected by the media carrying tube. It has been therefore recognized that concentrating solar radiation might better be accomplished by the use of a parabolic reflector focusing the solar energy to a single point where an appropriate target is positioned. Several experimental parabolic reflectors have been constructed for the purpose of concentrating energy to achieve very high temperatures and some have recorded temperatures of several thousand degrees Fahrenheit. It is recognized that this much concentration is undesirable for domestic use but concentrations of several hundred degrees would be desirable. The construction of a single parabolic reflector capable of gathering sufficient energy to heat the average house would be undesirably large and present an extremely expensive investment prospect. An additional problem is posed by where to place such a structure since most home owners would be reluctant to sacrifice any significant portion of their property to such a structure and few homes could safely bear the weight of the necessary superstructure and control devices required for a single parabolic reflector having a reflecting surface of 400 to 600 square feet which would be needed to collect the necessary solar energy.

SUMMARY OF THE INVENTION

It is an object therefore of this invention to focus the solar energy incident on a preselected area to a target of rather small dimension thus decreasing the amount of energy readmitted from the energy collecting target. A further object is to focus the energy using a plurality of independently positionable reflectors fixed in the immediate vicinity of the target thus reducing the overall weight and cost of the required structure. A further object of the invention is to provide means for positioning each of the independently positionable reflectors with respect to the target and the sun with the aid of sensors responsive to incident solar radiation.

These and other objects of the invention are satisfied by a system for collecting solar energy comprising a target means for absorbing solar radiation positioned a preselected distance above the horizon. The system further comprises a plurality of independently positioned reflector means fixed in the immediate vicinity of the target means for reflecting solar radiation to the target means. Each reflector means includes a base and a concave circular reflecting surface, the reflecting surface being substantially continuously reflective of incident visible and near infrared radiation except in a narrow slot-like area extending linearly from the center to the edge of the reflecting surface in which slot-like area the reflecting surface is transparent to at least a selected portion of any incident solar radiation. The system further comprises a positioning means fixed to each reflector means underneath the reflecting surface and responsive to incident solar radiation for positioning the reflector means with respect to the target means and the sun such that solar radiation incident upon the reflector means will be directed toward the target means.

One feature which can be included in such a system is a threshold means responsive to the presence of the sun above a predetermined minimum angle with respect to the horizon for initiating the positioning of the reflector means by the positioning means. The threshold means characteristicly comprises an upwardly opening cone fixed in the immediate vicinity of the target means such that the axis of rotation of the cone is substantially vertical. A sensor means, typically a photoelectric device which can be of the cadmium sulfide type, is positioned at the bottom of the cone and responds to incident solar radiation falling directly upon the device thus sensing when the sun is above the predetermined minimum angle with respect to the horizon as defined by the edge of the cone. The sensor means is connected to an appropriate circuit, an external source of power, and to the positioning means and permits the application of power to the positioning means only when the solar radiation is directly incident on the sensor means. The circuit can further comprise a distributor means for periodically directing power from the external source of power to selected ones of the positioning means so as to restrict the workload placed on the source of power at any one time. Other details of the threshold responsive means are to be found in the description of the preferred embodiments which follow.

The positioning means of each independently positionable reflector in the system according to this invention generally comprises an axis defining means fixed to the base for defining an initial reference axis for the reflector means. The initial reference axis is adjusted to be substantially co-linear with a line drawn from the target to the base of each reflector means, thus, the initial reference axis for each independently positionable reflector means is somewhat different from each other reflector means in the system. The positioning means further comprises an axial brace member attached to the reflector means and arranged co-linearly with the initial reference axis for rotation on that axis. The positioning means also includes rotating means for rotating the axial brace member and reflector means about the initial reference axis and angle deflecting means for deflecting the reflecting means angularly from said initial reference axis. The cooperation of the rotating means and the angle deflecting means permits the reflector to be positioned at substantially any angle within an upper hemisphere defined by a plane normal to the initial reference axis passing through the point of attachment between the reflector means and the axial brace member.

This extensive positioning ability is provided by the angle deflecting means comprising a reflector supporting member pivotally attached to the axial brace member for supporting the reflector. The reflector supporting member includes at least one longitudinal slot on a side of the reflector supporting member. The angle deflecting means also comprises a sensor support member pivotally attached to the axial brace member at the same point of attachment as the reflector supporting member. The sensor supporting member and reflector supporting member define a plane of finite thickness which includes the axial brace member and the slot-like area in the reflecting surface. The angle deflecting means also includes a first control arm pivotally connected to the axial brace member and pivotally and slideably received in the longitudinal slot in the reflector supporting member. A second control arm is pivotally connected to the sensor support member and pivotally and slidably received in the longitudinal slot in the reflector supporting member at the same point as the first control arm. In this manner, when the reflector supporting member pivots in the plane defined by the axial brace member reflector supporting member and sensor supporting member through an angle $\theta$, the sensor support member simultaneously pivots in the same plane through an angle $2\theta$.

The angle deflecting means also comprises a rack fixed to the axial brace member preferably on an arcuate support member extending outward from the axial brace member. A first motor means powered by an appropriate external source of power is fixed to the reflector supporting member and engages the rack for moving the reflector supporting member with respect to the axial brace member upon the application of power. A first sensor means is fixed to the sensor support member for movement therewith in alignment with the slot-like area of the reflecting surface. The first sensor means is connected to the first motor means for selectively permitting the application of power to the first motor means only in the absence of solar radiation directly incident upon the first sensor means. In this manner, the first motor means continuously operates until solar radiation coming through the slot-like area in the reflecting surface falls upon the sensor means fixed to the sensor support member. The first motor means not only moves the reflector supporting member with respect to the fixed rack but also moves the sensor support member through the cooperating action of the first and second control arm pivotally connected to the axial brace member and sensor supporting member respectively. Thus, as the first motor means moves the reflector supporting member through an angel $\theta$ the sensor support member simultaneously pivots in the same plane through an angle of $2\theta$ and the sensor means fixed to the sensor suppot member periodically pivots back and forth in alignment with the slot-like area in the reflecting surface. When the reflector supporting member and thus the reflecting surface is brought to the appropriate position, solar radiation will fall directly on the sensor means through the slot-like area in the reflecting surface thus stopping the first motor means from further movement and fixing the reflecting surface in that position. A careful consideration of the further description of the preferred embodiment together with the accompanying drawings will make the several features of the angle deflecting means more readily understood by those conversant in the art.

The rotating means for rotating the axial brace member and reflector means about the initial reference axis generally comprises a circular rack fixed at right angles to and surrounding the axial brace member. The circular rack can most advantageously define the lower perimeter of a hemispherical surface the axis of which corresponds with the initial reference axis of the system. The rotating means further means comprises a second motor means powered by an appropriate external source of power which is fixed to the element defining the initial reference axis of the system so as to engage the circular rack. In this manner the second motor means can engage the circular rack and rotate it with respect to the base. The rotating of the circular rack also causes the axial brace member to be rotated as well as the reflector supporting member and other elements of the angle deflecting means. A channel member is fixed to one side of the reflector supporting member, the channel member being arranged so as to define an aperture lying in the plane defined by the reflector supporting member, sensor support member and slot-like area in the reflecting surface. A second sensor means is fixed within the channel member so as to receive any solar radiation which is incident through the slot-like area in the reflecting surface and the aperture defined by the channel member. This second sensor means either alone or in combination with yet a third sensor means permits the application of power to the motor means only in the absence of solar radiation directly incident upon the second sensor. Thus, in a manner similar to the operation of the first sensor means and first motor means, the second motor means operates continually until solar radiation incident through the slot-like area in the reflecting surface falls on the second sensor means stopping the second motor means in that position.

Preferably the rotating means further comprises a chamber positioned on the sensor support member of the angle deflecting means. This chamber has a slot-like aperture aligned again with the slot-like area of the reflecting surface. A third sensor means is positioned within the chamber so as to receive solar radiation incident only through the slot-like area in the reflecting surface and the slot-like aperture of the chamber. An appropriate circuit is connected to the third sensor, the second sensor and to the second motor means for permitting the application of power to the second motor means only in the absence of solar radiation directly incident upon either the second or third sensor means. That is, if solar radiation penetrates the slot-like area of the reflecting surface and is incident upon either the second or third sensor means, the second motor means will be denied power thus freezing the circular rack, axial brace member and reflector in that position.

One may most simply consider the rotating means as a means for rotating the reflecting surface about the initial reference axis until the slot-like area in the reflecting surface is substantially radially aligned with the sun. On the other hand, the angle deflecting means is simply a means for deflecting the reflecting surface from the initial reference axis which aligns the reflecting with the target to a point where solar radiation incident upon the reflecting surface will be reflected toward the target.

The operation of the angle deflecting means is best understood by considering the radiation incident upon and reflected from a point near the center of the reflecting surface. In accordance with the well known of principles of physics, the angle of incidence, that is, the angle between a ray of incident sunlight and a line normal to the surface at the point of reflecting, is identically equal to the angle of reflection, the angle between the same normal line and the beam reflected from the reflecting surface. When the reflecting surface is positioned properly, the reflected ray of light will travel from the reflecting surface to the target. This reflected ray of light when travelling to the target traverses a path substantially parallel to the initial reference axis of the reflector since the initial reference axis is aligned substantially co-linear with a line drawn from the base to the target. Recalling that the reflector supporting member is fixed normal to the center of the reflecting surface, it will be apparent that the angle of reflection for radiation incident near the center of the reflecting surface will be identical to the angle between the reflector supporting member and the axial brace member which is arranged co-linearly with the initial reference axis. The sensor support member of the angle deflecting means is arranged to pivot simultaneously with the reflector supporting member through an angle of $2\theta$ while the reflector supporting member pivots through an angle $\theta$, the angles being measured from the initial reference axis. The angle between the sensor support member and the reflector supporting member is thus also equal to $\theta$. Upon careful consideration one recognizes than that the sensor support member is aligned with the incident solar radiation when the reflecting surface is appropriately adjusted to reflect the light toward the target.

In a preferred embodiment, the sensor support member comprises a tube open at the end opposite from the end pivotally attached to the axial brace member. When properly aligned, incident solar radiation penetrates down the inside of the tube. The first sensor means is then positioned inside the tube at an appropriate position between the open end and the point of pivotal attachment to the axial brace member.

While in general the angle deflecting means is capable of deflecting the reflector supporting member through a maximum of 45° and the sensor support member through a maximum of 90° while the rotating means is capable of rotating the reflector about 360°, in most installations once the limits of the solar path are established, motor reversing switches and limit stops can be added so as to confine the movement of the positioning means to only that which is necessary to cover the entire solar path. This has the additional advantage of conserving power utilized by the several motor means in the positioning system since a complete search can be conducted in a shorter period of time.

In a preferred embodiment of the energy collecting system according to this invention there is provided a means attached to each reflector means for utilizing the passing current of air to generate power. This same means also funtions to significantly reduce the effect of disturbing air forces on the concave reflecting surface. The generating means comprises a wind-responsive surface surrounding the circular reflecting surface and projecting below the reflecting surface in cylinder-like fashion. An axle member longitudinally penetrates and is dynamically supported by the reflector supporting member. The axle member is fixed to the wind-responsive surface by a plurality of spokes extending radially from the axle membr to the wind-responsive surface. A generating means is fixed to a lower end of the axle member for generating electrical power in response to the rotation of the wind-responsive surface. Means for conducting the power thus generated through an appropriate means for storing electrical power is also included. In one embodiment, at least one of the spokes carries a means such as a brush for periodically cleaning the reflecting surface.

It is preferable that each reflector unit concentrate the solar energy reflected by that unit in order that a relatively small collector target can be used. For this reason, the surface of each unit is concave thus having a focusing effect upon the reflected radiation. Preferably, the focal length of each reflecting surface is greater than the distance from the reflecting surface to the collecting target. This has the additional advantage in the event that the reflecting surface is not properly directing the reflected light toward the target of disbursing the reflected energy over a large area thus preventing any interference with adjacent structures, passing aircraft or the like.

While the following discussion of preferred embodiments is directed primarily toward a solar energy system according to this invention having particular utility with a one family dwelling, it will be recognized that this invention can also be of significant utility in commercial applications for large scale power production. Relatively high solar heat concentrations can then be useful in both thermoelectric device applications and for direct generating of electricity when used in conjunction with steam driven turbines and the like. One commercial application envisioned would have a plurality of units positioned around an appropriate cone-shaped hill, the reflector units all directing the incident sunlight to a central tower positioned on the top of the hill. This type of an installation would allow maximum exposure to both sun and wind. Other possible commercial installations might include placing solar energy systems according to this invention on the roofs of office buildings, shopping centers and the like. Additional specific applications of solar energy systems according to this invention will become apparent to one of ordinary skill in the art from the following discussion and by referring to the accompanying drawings.

DESCRIPTION OF PREFERRED EMBODIMENT

The system for collecting solar energy according to this invention which is illustrated in the accompanying figures comprises a target means 10 for absorbing solar radiation. The target means is positioned above the remaining portions of the system so that solar energy is easily reflected to the target means 10. The target means 10 is inturn connected by pipes or conduits 12 to an appropriate storage vault having a large heat capacity for storing heat energy. Heat storage vaults of this type are well-known in the art and form no part of this invention.

Figure 1:
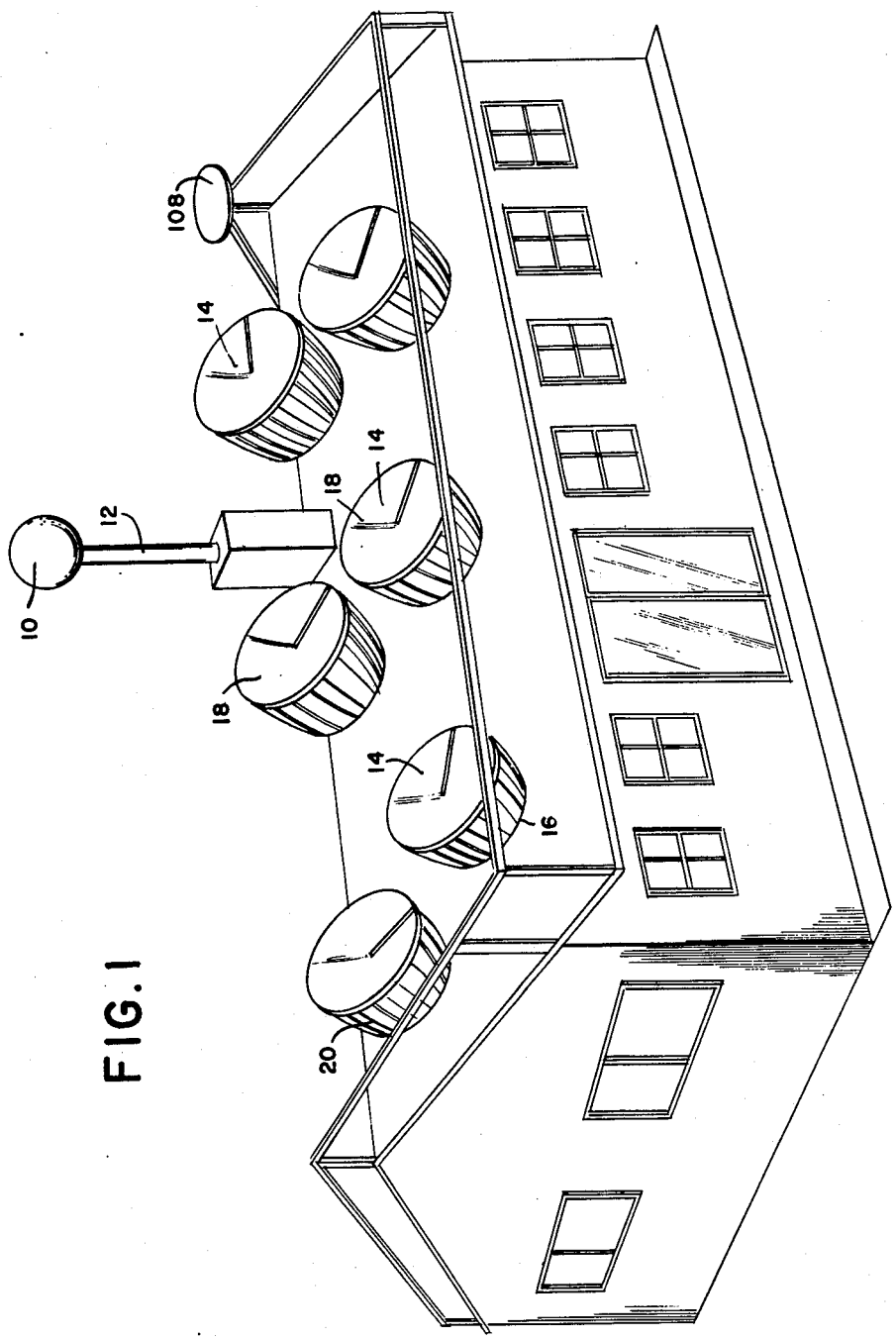
FIG. 1 is a perspective view of a solar energy system according to this invention installed on the roof of a small single family dwelling illustrating generally the geographic relationship between the target means and the plurality of independently positionable reflector means.

The solar energy system also comprises a plurality of independently positionable reflector means 14 located in the immediate vicinity of the target means 10 for reflecting solar radiation to the target means 10. Each reflector means 14 includes a base 16 and a concave circular reflecting surface 18. As illustrated in FIG. 1, each reflecting surface is surrounded by a drum-shaped wind-responsive surface 20 which, in combination with an appropriate generating means, generates electric power when rotated by passing air currents.

Figure 2:
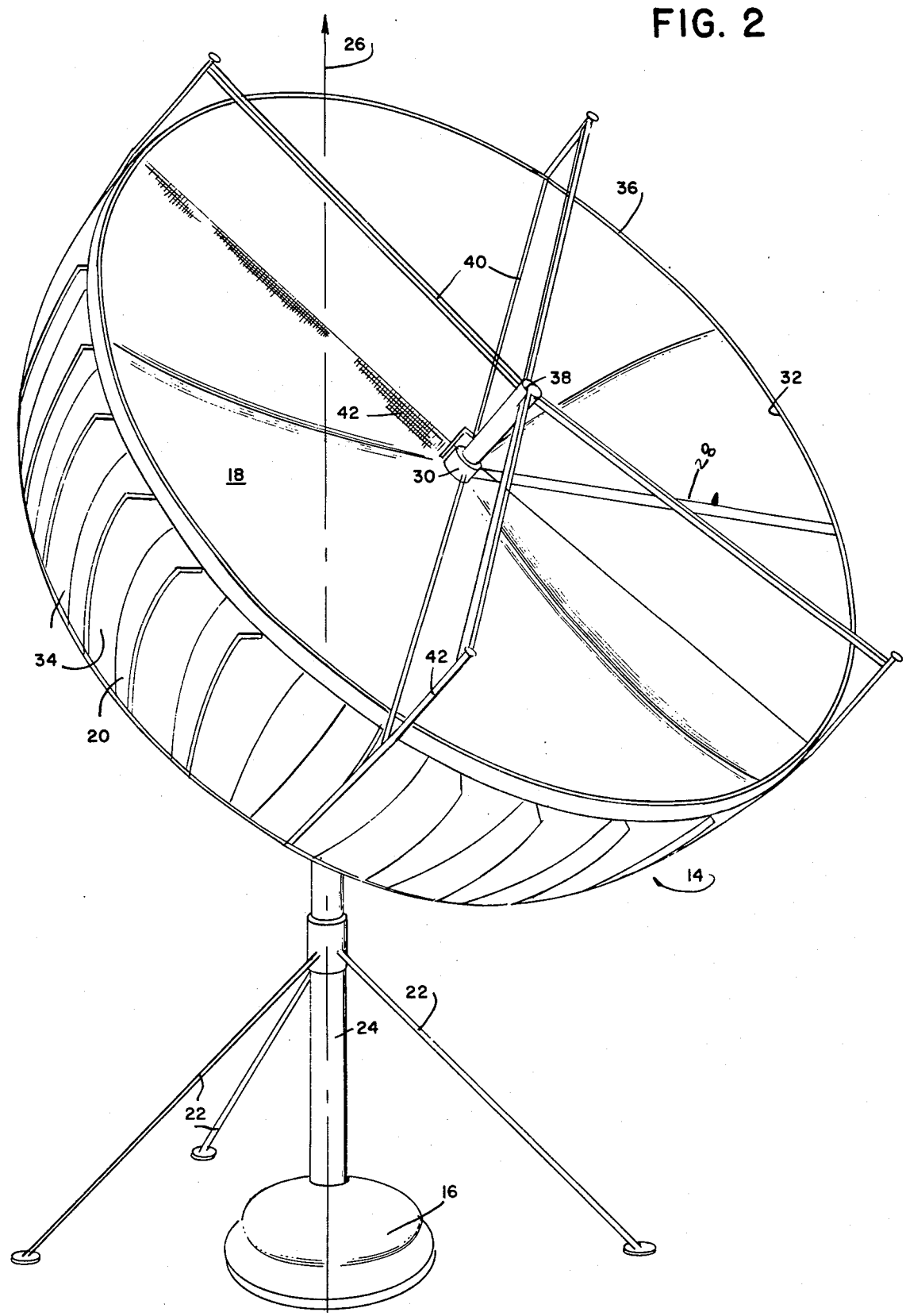
FIG. 2 is a perspective view of one of the independently positionable reflector means according to this invention showing the wind-responsive surface surrounding the concave reflecting surface.

As illustrated in FIG. 2 the reflector means 14 is fixed to the surface upon which it is mounted by a base member 16 and a plurality of stabilizing rods 22. The stabilizing rods 22 are adjusted such that an axis defining means 24 fixed to base 16 is aligned co-linearly with a line 26 drawn from the base to the target means. The line 26 is the initial reference axis for the reflector means. It will be appreciated that since each reflector means 14 is positioned in a unique special relationshp with the target 10, the initial reference axis 26 will be different for each of the plurality of independently positionable reflector means 14.

The concave circular reflecting surface 18 is preferably substantially continuously reflected of incident visible and near infrared radiation except in a narrow slot-like area 28 extending linearly from the center 30 to the edge 32 of the reflecting surface 18. In the slot-like area 28, the reflecting surface 18 is transparent to at least a selected portion of any incident solar radiation. In a preferred embodiment, the reflecting surface comprises a polished metal surface and to the slot-like area 28 comprises a transparent longitudinal insert of clear plastic to complete the concave surface.

The wind-responsive surface 20 has a plurality of louvers 34 for intercepting passing wind currents enhancing the wind responsiveness of the surface 20. The wind-responsive surface 20 is connected to the reflecting surface 18 by a circular bearing race 36 circumscribing the edge 32 of the reflecting surface 18. The wind-responsive surface 20 is attached to an axle member 38 by a plurality of spokes 40 extending radially from the axle 38 to brace members 42 fixed to the wind-responsive surface 20. At least one of the spokes 40 can also carry a brush 42 which revolves with the spoke for periodically cleaning the reflecting surface 18.

Figure 3:
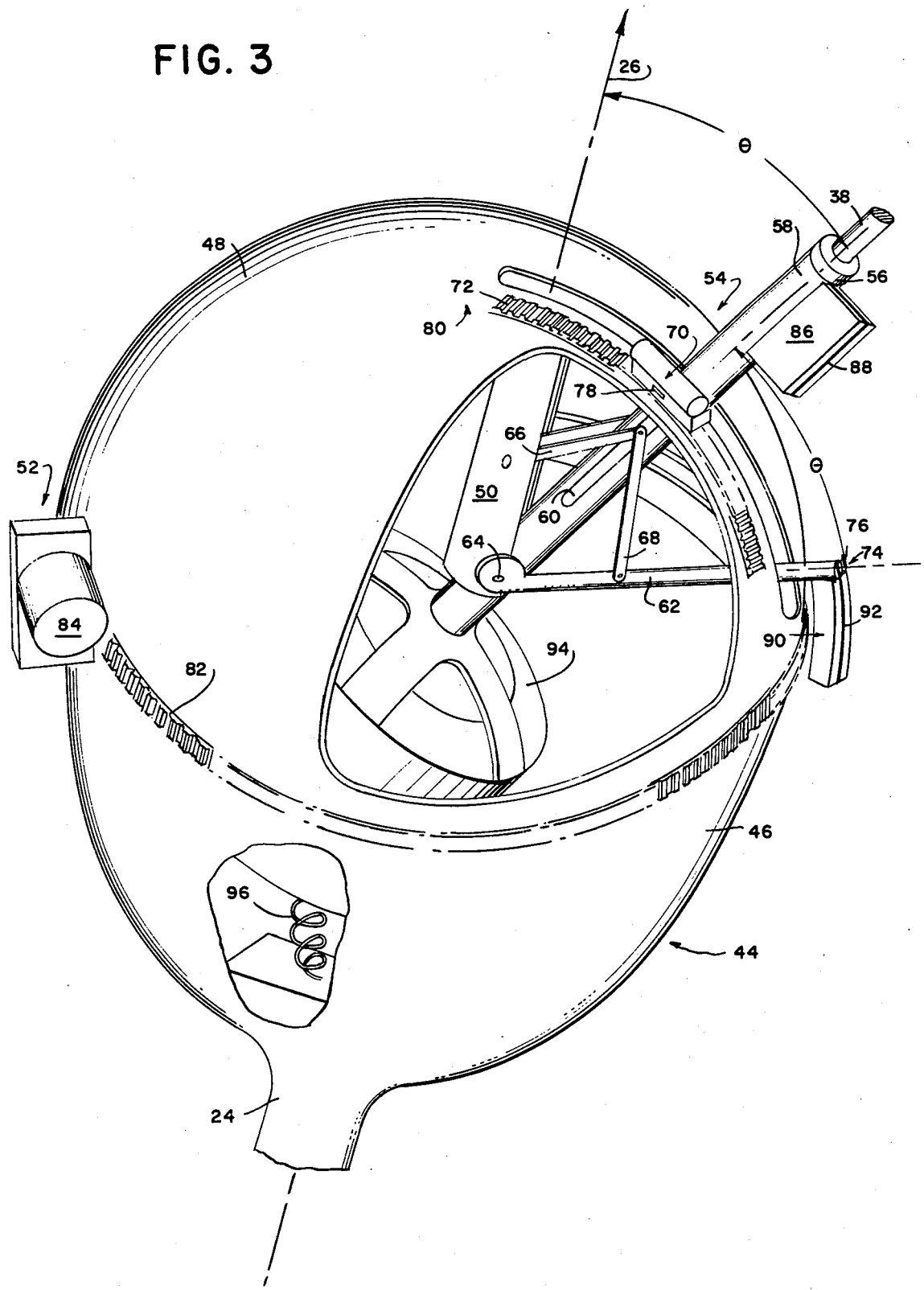
FIG. 3 is a perspective view of a positioning means according to this invention including the generating means for generating electric power with the wind-responsive surface.

Each reflector means 14 is independently positionable by a positioning means one embodiment of which is shown in FIG. 3 generally as 44. The positioning means is located underneath the reflecting surface 18 and has a lower portion 46 which is fixed to an is a part of the axis defining means 24. As illustrated in FIG. 3, this lower portion 46 can be an open network of members defining a hemispherical body. An upper hemispherical body 48 is cooperatively arranged with the lower hemispherical body 46 to rotate about the initial reference axis 26. Fixed to the upper hemispherical body 48 is an axial brace member 50 which is arranged co-linearly with the initial reference axis 26. The positioning means 44 also includes a rotating means 52 for rotating the upper hemispherical surface 48 and axial brace member 50 about the initial reference axis 26 and an angle deflecting means 54 for deflecting the reflecting surface 18 angularly from the initial reference axis.

the center 30 of the reflecting surface 18 is fixed to an upper end 56 of a reflector supporting member 58 which is pivotally attached to the axial brace member 50. The reflector supporting member 58 is arranged substantially normal to the central portion of the reflecting surface 18. The reflector supporting member 58 is illustrated in FIG. 3 to include a pair of longitudinal slots 60, one on each side of the reflector supporting member.

As well as the reflector supporting member 58, the angle deflecting means 54 also includes a sensor support member 62 pivotally attached to the axial brace member 50 at the same point of attachment 64 as the reflector supporting member 58. The sensor support member 62 and reflector supporting member 58 define a plane which includes the axial brace membr 50 and the slot-like area 28 in the reflecting surface 18.

Also included with the angle deflecting means 54 is a first control arm 66 pivotally connected to the axial brace member 50 and pivotally and slidably received in the longitudinal slot 60 in the reflector supporting member 58. A second control arm 68 is piovtally connected to the sensor support member 62 and pivotally and slidably rceived in the longitudinal slot 60 in the reflector supporting member 58 at the same point as the first control arm 66 such that when the reflector supporting member 58 pivots with respect to axial brace member 50 through an angle $\theta$, the sensor support member 62 simultaneously pivots with respect to the axial brace member through an angle of $2\theta$. The angle between the axial brace member 50 and reflector supporting member 58 always remains the same as the angle between the reflector supporting member 58 and sensor supporting member 62.

The angle deflecting means 54 deflects the reflecting surface 18 from alignment with the initial reference axis 26 by a first motor means 70 powered by an appropriate external source of power. The first motor means 70 is fixed to the reflector supporting membr 58 and engages a rack 72 with a pinion gear or other equivalent means, the rack 72 being fixed to the upper hemispherical member 48 and thus fixed with respect to the axial brace member 50. A first sensor means 74 is fixed to the sensor support member 62 for movement therewith in alignment with the slot-like area 28 of the reflecting surface 18. The first sensor means 74 is connected to the first motor means such that it permits the application of power to the first motor means 70 only in the absence of solar radiation directly incident upon the first sensor means 74. The sensor support member 62 preferably comprises a tube having an open end 76 with the first sensor means 74 being positioned down the inside of the tube between the open end 76 and the point of pivotal attachment 64. The motor means 70 can include a reversing switch 78 and pins 80 which are adjustably locatable with respect to the upper hemispherical surface 48 to restrict the region of search appropriately.

The rotating means 52 consists of a circular rack 82 surrounding the rim of the upper hemispherical surface 48. The circular rack 82 is engaged by a second motor means 84 fixed to the lower hemispherical member 46 which is inturn fixed to the axis defining means 24.

A channel member 86 is fixed to a side of the reflector supporting member 58 and has an aperture 88 coincident with the slot-like area 28 in the reflecting surface 18. A second sensor means is fixed within the channel member 86 to receive solar radiation incident through the slot-like area 28 and aperture 88. The second sensor means is connected to the second motor means 84 and permits the application of power to the motor means 84 only in the absence of solar radiation directly incident upon the second sensor means.

A chamber 90 is positioned on the sensor support member 62, the chamber 90 having a slot-like aperture 92 also aligned with the slot-like area 28 in the reflecting surfae 18. A third sensor means is positioned within the chamber 90 so as to receive solar radiation incident through the slot-like area 28 and slot-like aperture 92. The third sensor means is also connected to the second motor means 84 to permit the application of power to the second motor means only in the absence of solar radiation directly incident on the second motor means. In actual practice the second and third sensor means are connected by an appropriate circuit means so as to permit the application of power to the second motor means only in the absence of solar radiation directly falling incident on either the second or third sensor means.

The axial member 38 fixed to the wind-responsive surface 20 can be seen in FIG. 3 to penetrate longitudinally the reflector supporting member 58. The axial membr 38 is dynamically supported by the reflector supporting member 58 by means of appropriate bearings. A lower end of the axial member 38 is attached to a generating means 94 for generating electrical power in response to the rotation of the wind-responsive 20 by passing air currents. Means 96 for conducting any power thus generated to an appropriate means for storing electrical power is also included in the system.

Figure 4:
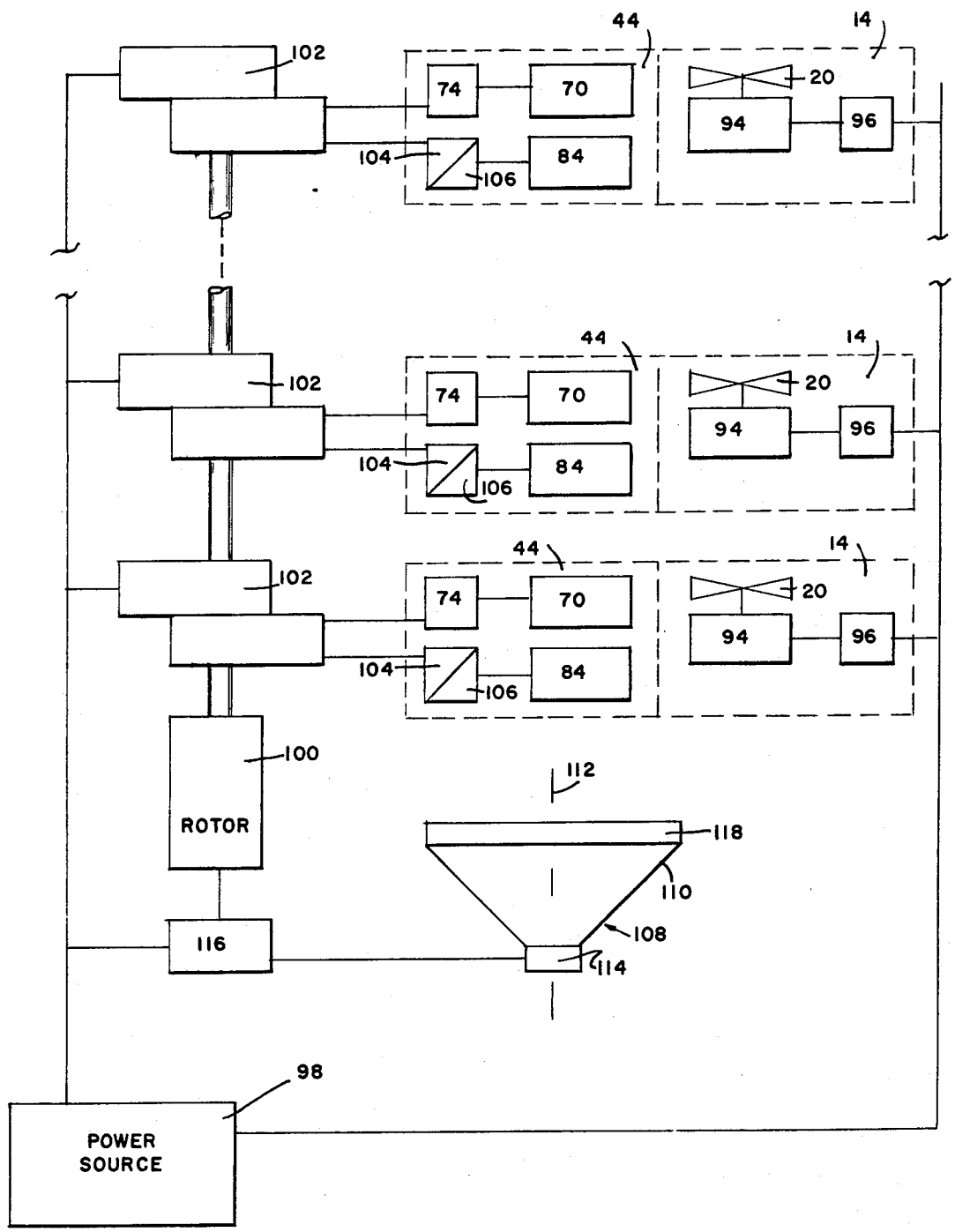
FIG. 4 is a block diagram of the electrical circuitry associated with the solar energy system according to this invention.

The electrical portion of a solar energy system according to this invention is more clearly understood from considering FIG. 4. Included in each of the dash-lined boxes is a reflector unit 14 according to this invention. It will be recognized that any number of reflector units may be used in conjunction with a single target and single power sytem. The electrical system includes a souce of power 98 which preferably is a battery bank or other equivalent means capable of both receiving and dispensing electrical power. The generating means 94 in each of the reflector units generate power in response to passing wind currents interacting with the wind-responsive surface 20. This generated electrical power is conveyed through appropriate circuitry 96 for permitting only the one directional flow of power from the generating means 94 to the power source 98. Electrical power from the power source is used to power a rotor 100 for rotating or otherwise manipulating a plurality of switches which when closed permit the application of power from the power source to the first and second motor means 70 and 84 respectively. The application of power to the first motor means is controlled as previously discussed by the first sensor means 74 while the application of power to the second motor means 84 is controlled by the cooperative operation of the second and third sensor means 104 and 106 respectively.

The rotor 100 is controlled by a threshold means 108 which is shown in FIG. 1 to be positioned in the vicinity of the remaining portions of a solar energy system according to this invention. This threshold means 108 permits the application of power to rotor 100 and thus to motor means 70 and 84 only when the sun is above a predetermined minimum angle with respect to the horizon. In general, the threshold means 108 comprises an upwardly opening cone 110 fixed such that when the axis of rotation of the cone 112 is substantially vertical. A threshold sensor means 114 is positioned at the bottom of the cone. When solar radiation is directly incident upon the threshold sensor means 114, the sun must of necessity be above the horizon at an angle defined by the upper edge of the cone. A circuit means 116 is connected to the threshold sensor means 114, source of power 98 and rotor 100 and permits the application of power to the positioning means sequentially by rotating the rotor periodically thus selectively causing power to be applied to one or more of the positioning means 44 of the reflector units 14. This selective application of power to the positioning means prevents overloading of the electrical system especially on start up after an idle period.

Since solar energy collection may be feasible at times other than when totally clear skies are present, yet hazy or partly cloudy periods will present a lesser degree of intensity to the threshold sensor means 114, a light sensitive glass cover 118 is included on the top of the cone to stabilize these variations of light intensity.

All of the sensors used in the solar energy system according to this invention may be of the cadmium sulfide type which are inexpensively available on a commercial basis but may have a range of value which may vary for different cells when exposed to the same intensity of light. A much closer tolerance may be obtained successively painting those of lower resistance value with a thin dark paint until they match the resistance value of cells yielding values in the upper part of the range thus producing elements which respond equally to the same intensity of light stimulus. This permits the use of the same tuned electronic circuitry to control a number of individual units in a timed sequence. Each of the sensors used in the system can include a light sensitive glass cover similar to cover 118 to stablize the variations in light intensity due to sky conditions. Appropriate current-limiting circuitry can also be included to further stabilize the signal output of the sensors.

Although the invention has been described in considerable detail with reference to certain preferred embodiments thereof, it will be understood that variations and modifications can be effected within the spirit and scope of the invention as described above and as defined in the appended claims.

What is claimed is:

1. A system for collecting solar energy comprising:
   A. a target means for absorbing solar radiation positioned a pre-selected distance above the horizon,
   B. a plurality of independently positionable reflector means fixed in the immediate vicinity of the target means for reflecting solar radiation to the target means, each reflector means including a base and a concave circular reflecting surface, the reflecting surface being substantially continuously reflective of incident visible and near infrared radiation except in a narrow slot-like area extending linearly from the center to the edge of the reflecting surface in which slot-like area the reflecting surface is transparent to at least a selected portion of any incident solar radiation, and
   C. positioning means fixed to each reflector means underneath the reflecting surface and responsive to incident solar radiation for positioning the reflector means with respect to the target means and the sun such that solar radiation incident upon the reflector means will be directed toward the target means, the positioning means comprising:
      i. an axis means fixed to said base for defining an initial reference axis for the reflector means, said initial reference axis being substantially co-linear with a line drawn from the target means to the base,
      ii. an axial brace member attached to the the reflector means and arranged co-linearly with said initial reference axis for rotation on that axis,
      iii. rotating means for rotating the axial brace member and reflector means about said initial reference axis, and
      iv. angle deflecting means for deflecting the reflector means angularly from said initial reference axis, said angle deflecting means comprising:
      a. a reflector supporting member pivotally attached to the axial brace member for supporting said reflector means, the reflector supporting member being arranged substantially normal to a central portion of the reflecting surface of the reflector means, the reflector supporting member including at least one longitudinal slot on a side of the reflector supporting member,
      b. a sensor support member, pivotally attached to the axial brace member at the same point of attachment as the reflector supporting member, the sensor support member and reflector supporting member defining a plane which includes the axial brace member and the slot-like area of the reflecting surface,
      c. a first control arm pivotally connected to the axial brace member and pivotally and slidably received in the longitudinal slot in the reflector supporting member, and
      d. a second control arm pivotally connected to the sensor support member and pivotally and slidably received in the longitudinal slot in the reflector supporting member at the same point as the first control arm such that when said reflector supporting member pivots in said plane through an angle $\theta$, the sensor support member simultaneously pivots in said plane through an angle $2\theta$.

2. The system of claim 1 wherein said angle deflecting means further comprises:
   a. a rack fixed to said axial brace member,
   b. a first motor means, powered by an appropriate external source of power, fixed to said reflector supporting member and engaging the rack on the axial brace member for moving the reflector supporting member with respect to the axial brace member upon the application of power, and
   c. a first sensor means fixed to said sensor support member for movement therewith in alignment with the slot-like area of the reflecting surface and connected to the first motor means for selectively permitting the application of power to the first motor means only in the absence of solar radiation directly incident upon the first sensor means.

3. The system of claim 2 wherein the sensor support member comprises a tube open at the end opposite the end pivotally attached to the axial brace member for receiving incident solar radiation down the inside of the tube, the first sensor means being positioned within said tube between the open end and the point of pivotal attachment to the axial brace member.

4. The system of claim 1 further comprising:
   a. a wind-responsive surface surrounding the circular reflecting surface,
   b. an axial member longitudinally penetrating and dynamically supported by the reflector supporting member, the axle member being fixed to the wind responsive surface by a plurality of spokes extending radially from the axle member to the wind responsive surface,
   c. generating means fixed to a lower end of the axle member for generating electric power in response to the rotation of the wind responsive surface, and
   d. means for conducting any power thus generated to an appropriate means for storing electrical power.

5. The system of claim 4 wherein at least one of said spokes carries a means for periodically cleaning the reflecting surface.

6. A system for collecting solar energy comprising:
   A. a target means for absorbing solar radiation positioned a preselected distance above the horizon,
   B. a plurality of independently positionable reflector means fixed in the immediate vicinity of the target means for reflecting solar radiation to the target means, each reflector means including a base and a concave circular reflecting surface, the reflecting surface being substantially continuously reflective of incident visible and near infrared radiation except in a narrow slot-like area extending linearly from the center to the edge of the reflecting surface in which slot-like area the reflecting surface is transparent to at least a selected portion of any incident solar radiation, and
   c. positioning means fixed to each reflector means underneath the reflecting surface and responsive to incident solar radiation for positioning the reflector means with respect to the target means and the sun such that solar radiation incident upon the reflector means will be directed toward the target means, the positioning means comprising:
  i. an axis means fixed to said base for defining an initial reference axis for the reflector means, said initial reference axis being substantially co-linear with a line drawn from the target means to the base,
  ii. an axial brace member attached to the reflector means and arranged co-linearly with said initial reference axis for rotation on that axis,
  iii. rotating means for rotating the axial brace member and reflector means about said initial reference axis, and
  iv. angle deflecting means for deflecting the reflector means angularly from said initial reference axis, said rotating means comprising:
  a. circular rack fixed at right angles to and surrounding the axial brace member,
  b. second motor means, powered by an appropriate external source of power, fixed to said axis means, and engaging the circular rack for rotating the axial brace member with respect to the axis means,
  c. a channel member fixed to a side of the reflector supporting member, the channel member having an aperture arranged in said plane defined by the reflector supporting member and sensor support member coincident with said slot-like area in the reflecting surface, and
  d. second sensor means, fixed within the channel member to receive solar radiation incident through the slot-like area in the reflecting surface and the aperture and connected to the second motor means, for permitting the application of power to the motor means only in the absence of solar radiation directly incident upon the second sensor means.

7. The system of claim 6 wherein said rotating means further comprises:
  a. a chamber positioned on said sensor support member, the chamber having a slot-like aperture aligned with the slot-like area in the reflecting surface,
  b. third sensor means positioned within the chamber so as to receive solar radiation incident only through the slot-like area of the reflecting surface and slot-like aperture of the chamber, and
  c. circuit means connected to the third sensor means and to the second motor means for permitting the application of power to the second motor means only in the absence of solar radiation directly incident on either the second or third sensor means.

8. A system for collecting solar energy comprising:
  A. a target means for absorbing solar radiation positioned a preselected distance above the horizon,
  B. a plurality of independently positionable reflector means fixed in the immediate vicinity of the target means for reflecting solar radiation to the target means, each reflector means including a base and a concave circular reflecting surface, the reflecting surface being substantially continuously reflective of incident visible and near infrared radiation except in a narrow slot-like area extending linearly from the center to the edge of the reflecting surface in which slot-like area the reflecting surface is transparent to at least a selected portion of any incident solar radiation, and
  C. positioning means fixed to each reflector means underneath the reflecting surface and responsive to incident solar radiation for positioning the reflector means with respect to the target means and the sun such that solar radiation incident upon the reflector means will be directed toward the target means, the positioning means comprising:
    i. an axis means fixed to said base for defining an initial reference axis for the reflector means, said initial reference axis being substantially co-linear with a line drawn from the target means to the base,
    ii. An axial brace member attached to the reflector means and arranged co-linearly with said initial reference axis for rotation on that axis,
    iii. rotating means for rotating the axial brace member and reflector means about said initial reference axis, and
    iv. angle deflecting means for deflecting the reflector means angularly from said initial reference axis, said rotating means comprising:
  a. a circular rack fixed at right angles to and surrounding the axial brace member,
  b. second motor means, powered by an appropriate external source of power, fixed to the axis means, and engaging the circular rack for rotating the axial brace member with respect to the axis means,
  c. a chamber positioned on said sensor support member, the chamber having a slot-like aperture aligned with the slot-like area in the reflecting surface, and
  d. third sensor means, positioned within the chamber to receive solar radiation incident through the slot-like area of the reflecting surface and the slot-like aperture of the chamber and connected to the second motor means, for permitting the application of power to the motor means only in the absence of solar radiation directly incident on the third sensor means.

9. The system of claim 8 wherein said rotating means further comprises:
  a. a channel member fixed to a side of the reflector supporting member having a slot-like aperture arranged in the same plane as the reflector supporting member and sensor support member,
  b. second sensor means, fixed within the channel member and connected to the second motor means for receiving solar radiation incident only through the slot-like area in the reflecting surface and slot-like aperture of the channel member, and
  c. circuit means for permitting the application of power to the second motor means only in the absence of solar radiation directly incident on either the second or third sensor means.

10. A system for collecting solar energy comprising:
  a. a target means for absorbing solar radiation positioned a preselected distance above the horizon,
  b. a plurality of independently positionable reflector means fixed in the immediate vicinity of the target means for reflecting solar radiation to the target means, each reflector means including a base and a concave circular reflecting surface, the reflecting surface being substantially continuously reflective of incident visible and near infrared radiation except in a narrow slot-like area extending linearly from the center to the edge of the reflecting surface in which slot-like area the reflecting surface is transparent to at least a selected portion of any incident solar radiation, c. positioning means fixed to each reflector means underneath the reflecting surface and responsive to incident solar radiation for positioning the reflector means with respect to the target means and the sun such that solar radiation incident upon the reflector means will be directed toward the target means, and d. threshold means responsive to the presence of the sun above a predetermined minimum angle with respect to the horizon for initiating the positioning of the reflector means by the positioning means, wherein the threshold means further comprises:
  i. an upwardly opening cone fixed in the immediate vicinity of the target means such that the axis of rotation of the cone is substantially vertical,
  threshold sensor means positioned at the bottom of the cone and responsive to incident solar radiation falling directly upon the sensor means for sensing when the sun is above the predetermined minimum angle with respect to the horizon,
  iii. circuit means connected to the threshold sensor means, an external source of power, and to the said positioning means for permitting the application of power to the positioning means only when solar radiation is directly incident on the threshold sensor means.

11. The system of claim 10 wherein said circuit means further comprises distributor means for periodically directing power from said external source of power to selected ones of said positioning means whereby the work load placed on the source of power is never permitted to exceed a preestablished maximum.

12. An independently positionable reflecto means for reflecting solar radiation to a preselected target comprising:
  a. a base,
  b. an axis defining means fixed to the base for defining an initial reference axis,
  c. an axis brace member arranged co-linearly with the initial reference axis for rotation upon that axis,
  d. rotating means for rotating the axial brace member about the initial reference axis,
  e. angle deflecting means deflectable angularly from the initial reference axis, and
  f. a concave circular reflecting surface fixed to the deflecting means for movement therewith, the reflecting surface being substantially continuously reflective of incident visible and near infrared radiation except in a narrow slot-like area extending linearly from the center to the edge of the reflecting surface in which slot-like area the reflecting surface is transparent to at least a selected portion of any incident solar radiation, the angle deflecting means and the rotating means being responsive to solar radiation incident through the narrow slot-like area in the reflecting surface for positioning the reflecting surface with respect to the sun such that solar radiation incident on the reflecting surface will be directed to a preselected target, and wherein the angle deflecting means further comprises:
  i. a reflector supporting member pivotally attached to the axial brace member for supporting the reflector means, the reflector supporting member being arranged substantially normal to a central position of the reflecting surface, the reflector supporting member being arranged substantially normal to a central portion of the reflecting surface, the reflector supporting member including at least one longitudinal slot on a side of the reflector supporting member,
  ii. a sensor support member, pivotally attached to the axial brace member at the same point of attachment as the reflector supporting member, the sensor support member and the reflector supporting member defining a plane which includes the axial brace member and the slot-like area of the reflecting surface,
  iii. a first control arm pivotally connected to the axial brace member and pivotally and slidable received in the longitudinal slot in the reflector supporting member,
  iv. a second control arm pivotally connected to the sensor support member and pivotally and slidably received in the longitudinal slot in the reflector supporting member at the same point as the first control arm such that when the reflector supporting member pivots with respect to the axial brace member through an angle, the sensor support member simultaneously pivots with respect to the axial brace member through an angle $2\theta$,
  v. a rack fixed to the axial brace member,
  vi. a first motor means powered by an appropriate external source of power, fixed to the reflector supporting member and engaging the rack on the axial brace member for moving the reflector supporting member with respect to the axial brace member upon the application of power, and
  vii. a first sensor means fixed to the sensor support member for movement therewith in alignment with the slot-like area of the reflecting surface and connected to the first motor means for selectively permitting the application of power to the first motor means only in the absence of solar radiation directly incident upon the first sensor means.

13. An independently positionable reflector means for reflecting solar radiation to a preselected target comprising:
  a. a base,
  b. an axis defining means fixed to the base for defining an initial reference axis,
  c. an axial brace member arranged co-linearly with the initial reference axis for rotation upon that axis,
  d. rotating means for rotating the axial brace member about the initial reference axis,
  e. angle deflecting means deflectable angularly from the initial reference axis, and
  f. a concave circular reflecting surface fixed to the deflecting means for movement therewith, the reflecting surface being substantially continuously reflective of incident visible and near infrared radiation except in a narrow slot like area extending linearly from the center to the edge of the reflecting surface in which slot-like area the reflecting surface is transparent to at least a selected portion of any incident solar radiation, the angle deflecting means and the rotating means being responsive to solar radiation incident through the narrow slot-like area in the reflecting surface for positioning the reflecting surface with respect to the sun such that solar radiation incident on the reflecting surface will be directed to a preselected target, and wherein the rotating means further comprises:

i. a circular rack fixed at right angles to and surrounding the axial brace member,
ii. second motor means, powered by an appropriate external source or power, fixed to said axis means, and engaging the circular rack for rotating the axial brace member with respect to the axis means,
iii. a channel member fixed to a side of the reflector supporting member, the channel member having an aperture arranged coincident with the slot-like area in the reflecting surface,
iv. second sensor means fixed within the channel member to receive solar radiation incident through the slot-like area in the reflecting surface and the aperture in the channel member,
v. a chamber positioned on the sensor support member, the chamber having a slot-like aperture aligned with the slot-like area of the reflecting surface,
vi. third sensor means positioned within the chamber so as to receive solar radiation incident only through the slot-like area in the reflecting surface and the slot-like aperture of the chamber, and
vii. circuit means connected to the second and third sensor means and to the second motor means for permitting the application of power to the second motor means only in the absence of solar radiation directly incident upon either the second or third sensor means.

14. An independently positionable reflector means for reflecting solar radiation to a preselected target comprising:
    a. a base,
    b. an axis defining means fixed to the base for defining an initial reference axis,
    c. an axis brace member arranged co-linearly with the initial reference axis for rotation upon that axis,
    d. rotating means for rotating the axial brace member about the initial reference axis,
    e. angle deflecting means deflectable angularly from the initial reference axis,
    f. a concave circular reflecting surface fixed to the deflecting means for movement therewith, the reflecting surface is transparent to at least a selected portion of any incident solar radiation, the angle deflecting means and the rotating means being responsive to solar radiation incident through the narrow slot-like area in the reflecting surface for positioning the reflecting surface with respect to the sun such that solar radiation incident on the reflecting surface will be directed to a preselected target,
    g. a drum-shaped wind-responsive surface surrounding the circular reflecting surface,
    h. an axle member longitudinally penetrating the dynamically supported by the reflector supporting member, the axle member being fixed to the wind-responsive surface by a plurality of spokes extending radially from the axle member to the wind-responsive surface, at least one of the spokes carrying means for periodically cleaning the reflecting surface,
    i. generating means fixed to a lower end of the axle member for generating electrical power in response to the rotation of the wind-responsive surface by passing air currents, and
    j. means for conducting any power thus generated to an appropriate means for storing electrical power.

15. A positioning mechanism for positioning a reflecting surface with respect to a base such that solar radiation incident upon the reflecting surface will be directed toward a preselected target comprising:
    a. an axis means fixed to the base for defining an initial reference axis for the reflector means, said initial reference axis being substantially co-linear with a line drawn from the base to the target means,
    b. an axis brace member attached to the reflector means and arranged co-linearly with the initial reference axis for rotation upon that axis,
    c. rotating means for rotating the axial brace member and reflector means about the initial reference axis and
    d. angle deflecting means for deflecting the reflector means angularly from the initial reference axis,
    the angle deflecting means comprising:
        i. a reflector supporting member pivotally attached to the axial brace member for supporting the reflector means, the reflector supporting member being arranged substantially normal to a central portion of the reflecting surface, the reflector supporting member including at least one longitudinal slot on a side of the reflector supporting member,
        ii. a sensor support member, pivotally attached to the axial brace member at the same point of attachment as the reflector supporting member, the sensor support member and the reflector supporting member defining a plane which includes the axial brace member and the slot-like area of the reflecting surface,
        iii. a first control arm pivotally connected to the axial brace member and pivotally slidably received in the longitudinal slot in the reflector supporting member,
        iv. a second control arm pivotally connected to the sensor support member and pivotally and slidably received in the longitudinal slot in the reflector supporting member at the same point as the first control arm such that when the reflector supporting member pivots with respect to the axial brace member through an angle $\theta$, the sensor support member simultaneously pivots with respect to the axial brace member through an angle $2\theta$,
        v. a rack fixed to the axial brace member,
        vi. a first motor means powered by an appropriate external source of power, fixed to the reflector supporting member and engaging the rack on the axial brace member for moving the reflector supporting member with respect to the axial brace member upon the application of power, and
        vii. a first sensor means fixed to the sensor support member for movement therewith in alignment with the slot-like area of the reflecting surface and connected to the first motor means for selectively permitting the application of power to the first motor means only in the absence of solar radiation directly incident upon the first sensor means.

16. A positioning mechanism for positioning a reflecting surface with respect to a base such that solar radiation incident upon the reflecting surface will be directed toward a preselected target comprising:
    a. an axis means fixed to the base for defining an initial reference axis for the reflector means, said initial reference axis being substantially co-linear with a line drawn from the base to the target means, b. an axial brace member attached to the reflector means and arranged co-linearly with the initial reference axis and
c. rotating means for rotating the axial brace member and reflector means about the initial reference axis and
d. angle deflecting means for deflecting the reflector means angularly from the initial reference axis,
the rotating means comprising:
  i. a circular rack fixed at right angles to and surrounding the axial brace member,
  ii. second motor means, powered by an appropriate external source or power, fixed to said axis means, and engaging the circular rack for rotating the axial brace member with respect to the axis means,
  iii. a channel member fixed to a side of the reflector supporting member, the channel member having an aperture arranged coincident with the slot-like area in the reflecting surface,
  iv. second sensor means fixed within the channel member to receive solar radiation incident through the slot-like area in the reflecting surface and the aperture in the channel member,
  v. a chamber positioned on the sensor support member, the chamber having a slot-like aperture aligned with the slot-like area of the reflecting surface,
  vi. third sensor means positioned within the chamber so as to receive solar radiation incident only through the slot-like area in the reflecting surface and the slot-like aperture of the chamber, and
  vii. circuit means connected to the second and third sensor means and to the second motor means for permitting the application of power to the second motor means only in the absence of solar radiation directly incident upon either the second or third sensor means.

* * * * *